United States Patent
Hemphill et al.

(10) Patent No.: US 9,016,454 B2
(45) Date of Patent: Apr. 28, 2015

(54) TWO STAGE PISTON FOR FASTER CLUTCH APPLY

(71) Applicant: Schaeffler Technologies AG & Co. KG, Herzogenaurach (DE)

(72) Inventors: Jeffrey Hemphill, Copley, OH (US); Patrick M. Lindemann, Wooster, OH (US)

(73) Assignee: Schaeffler Technologies AG & Co., KG, Herzogenaurach (DE)

( * ) Notice: Subject to any disclaimer, the term of this patent is extended or adjusted under 35 U.S.C. 154(b) by 283 days.

(21) Appl. No.: 13/714,963

(22) Filed: Dec. 14, 2012

(65) Prior Publication Data
US 2013/0161146 A1 Jun. 27, 2013

Related U.S. Application Data

(60) Provisional application No. 61/579,865, filed on Dec. 23, 2011.

(51) Int. Cl.
*F16D 25/0638* (2006.01)
*F16D 25/0635* (2006.01)
*F16D 48/02* (2006.01)

(52) U.S. Cl.
CPC ........ *F16D 25/0635* (2013.01); *F16D 25/0638* (2013.01); *F16D 2048/0212* (2013.01); *F16D 2048/0221* (2013.01)

(58) Field of Classification Search
CPC ............ F16D 25/0635; F16D 25/0638; F16D 25/042; F16D 25/044; F16D 25/12; F16D 2125/10; F16D 2048/0212; F16D 2048/0221
USPC .......... 192/85.24, 85.25, 85.27, 85.31, 85.35, 192/85.39, 52.1, 52.4, 52.5
See application file for complete search history.

(56) References Cited

U.S. PATENT DOCUMENTS

| | | | |
|---|---|---|---|
| 3,915,274 A | 10/1975 | Utter | |
| 4,325,471 A * | 4/1982 | Schuster | 192/85.38 |
| 5,749,451 A | 5/1998 | Grochowski | |
| 6,162,147 A | 12/2000 | Moorman | |
| 6,971,494 B2 | 12/2005 | Puiu | |
| 7,104,380 B2 | 9/2006 | Bishop et al. | |
| 7,370,745 B2 | 5/2008 | Lindenschmidt et al. | |
| 2004/0168874 A1 * | 9/2004 | Buck et al. | 192/18 A |
| 2009/0071787 A1 | 3/2009 | Hemphill et al. | |
| 2011/0315503 A1 * | 12/2011 | Ari et al. | 192/85.63 |

FOREIGN PATENT DOCUMENTS

JP 2008190720 8/2008
KR 1020080073233 8/2008

* cited by examiner

*Primary Examiner* — Jacob S Scott
(74) *Attorney, Agent, or Firm* — Simpson & Simpson, PLLC

(57) ABSTRACT

A clutch assembly, including: a secondary piston assembly; a primary piston including a portion located radially outward of the secondary piston assembly; a first chamber at least partially formed by a first side of the primary piston; a second chamber at least partially formed by the secondary piston assembly and a second side of the primary piston; and a check valve connecting the first and second chambers. For a first force applied by fluid in the first chamber: the primary piston remains axially stationary; the fluid flows from the first chamber into the second chamber; and the secondary piston assembly displaces in a first axial direction to contact a clutch pack. For an increase of the first force to a second force: fluid flow between the first and second chambers is blocked by the check valve; and the primary piston and the secondary piston assembly displace in the first axial direction to close the clutch pack.

17 Claims, 6 Drawing Sheets

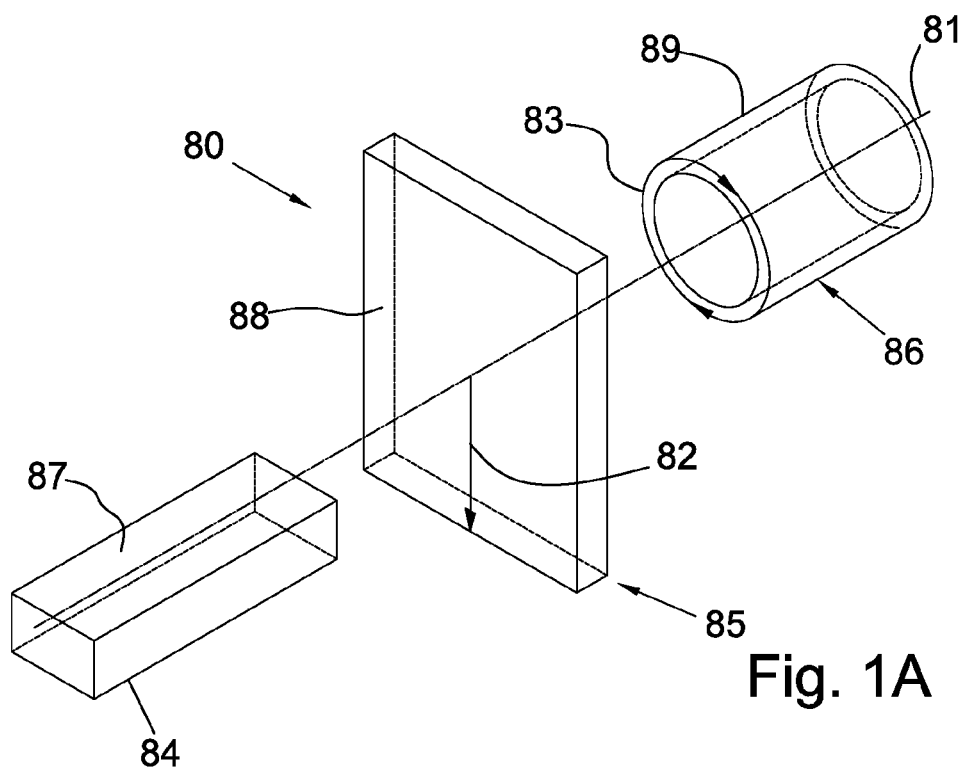
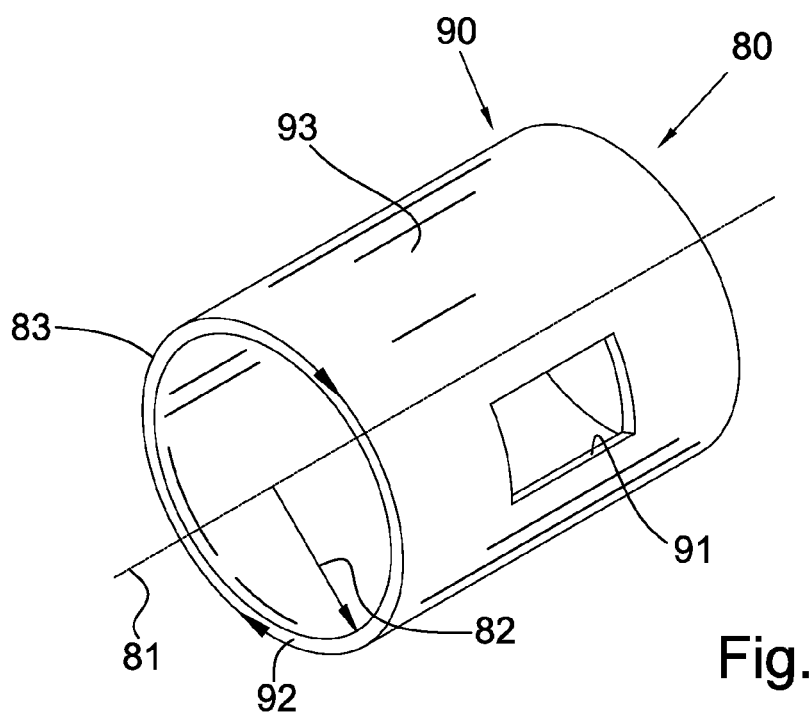
Fig. 1A
Fig. 1B

TWO STAGE PISTON FOR FASTER CLUTCH APPLY

CROSS-REFERENCE TO RELATED APPLICATIONS

This application claims the benefit under 35 U.S.C. §119 (e) of U.S. Provisional Patent Application No. 61/579,865, filed Dec. 23, 2011.

TECHNICAL FIELD

The present disclosure relates to a clutch assembly with reduced apply time and losses, in particular, a dual piston clutch assembly for an automatic transmission.

BACKGROUND

It is known to use a hydraulic piston to close a clutch pack in a clutch for an automatic transmission. It is desirable to minimize the time required to close such a clutch by reducing the travel needed for the piston to engage and compress the clutch pack. The travel can be reduced by minimizing spacing between clutch plates in the clutch pack. However, minimizing the spacing increases the viscous drag between the clutch plates, which increases losses for the transmission and increases fuel consumption for a vehicle using the transmission. Also, the greater the travel required for the piston, the greater the amount of fluid needed to displace the piston. Increasing the amount of fluid needed increases the work required of a pump for the fluid, further increases losses in the transmission.

U.S. Pat. No. 6,162,147 describes a single piston for a clutch assembly with two pressure chambers for displacing the piston. One of the chambers is pressurized more quickly than the other chamber. U.S. Pat. No. 3,915,274 describes a dual piston arrangement for a clutch assembly with dual pressure chambers and a common fluid input line. The two chambers are independently connected to the input line. That is, there is no direct flow of fluid between the two chambers. An outer piston is initially displaced by an increase in pressure in one chamber to contact move the inner piston into contact with a clutch pack. The movement of the inner piston due to contact with the outer piston increases a volume of the other chamber and pressure is increased in the other chamber in a timed relation to the pressure increase in the outer chamber. As pressure in the other chamber increases, the inner piston displaces independently of the outer piston to close the clutch pack.

SUMMARY

According to aspects illustrated herein, there is provided a clutch assembly, including: a secondary piston assembly; a primary piston including a portion located radially outward of the secondary piston assembly; a first chamber at least partially formed by a first side of the primary piston; a second chamber at least partially formed by the secondary piston assembly and a second side of the primary piston; and a check valve connecting the first and second chambers. For a first force applied by fluid in the first chamber: the primary piston remains axially stationary; the fluid flows from the first chamber into the second chamber; and the secondary piston assembly displaces in a first axial direction to contact a clutch pack. For an increase of the first force to a second force: fluid flow between the first and second chambers is blocked by the check valve; and the primary piston and the secondary piston assembly displace in the first axial direction to close the clutch pack.

According to aspects illustrated herein, there is provided a clutch assembly, including: a primary piston; a secondary piston assembly; a first chamber at least partially formed by the primary piston; and a second chamber at least partially formed by the secondary piston assembly and the primary piston. The assembly is arranged such that in response to fluid force in the first chamber at a first level: the primary piston remains axially stationary; a second force in the secondary piston assembly increases; and the secondary piston assembly displaces in a first axial direction to contact a clutch pack, The assembly is arranged such that in response to an increase in the first level: fluid in the first chamber is isolated from fluid in the second chamber; and the primary piston and the secondary piston assembly displace in unison in the first axial direction to close the clutch pack.

According to aspects illustrated herein, there is provided a clutch assembly, including: a clutch pack; a primary piston; a secondary piston assembly; a first chamber at least partially formed by a first side of the primary piston; a second chamber at least partially formed by the secondary piston assembly and a second side of the primary piston; and a check valve. The check valve includes: a channel connecting the first and second chambers; a displaceable element at least partially disposed in the channel; a first resilient element in constant contact with the displaceable element; and a second resilient element at least partially disposed in the channel. The secondary piston assembly is arranged to displace in a first axial direction to contact and close the clutch pack.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application;

DETAILED DESCRIPTION

Figure 2:
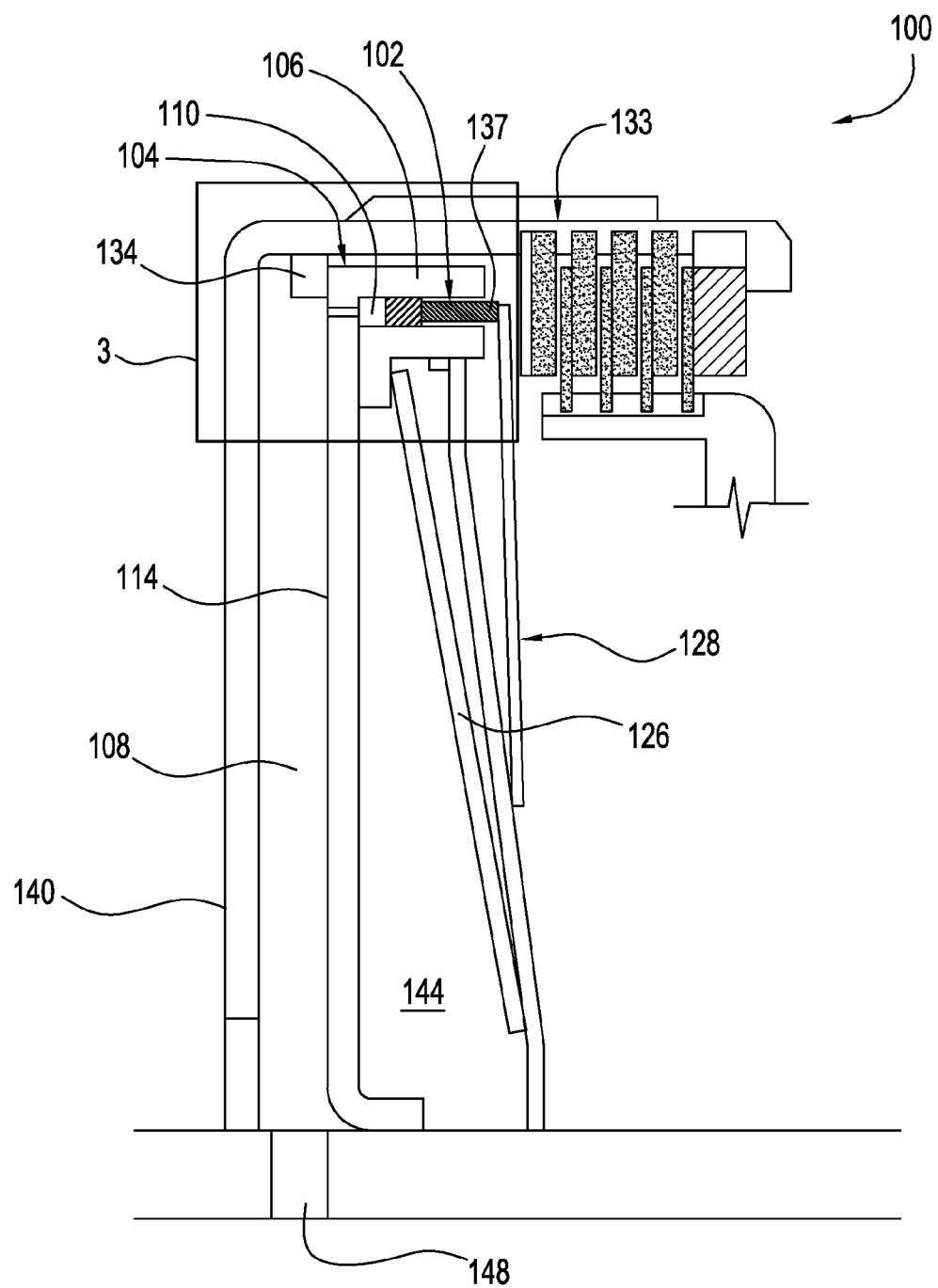
FIG. 2 is a partial cross-sectional view of a clutch assembly in a clutch open position.

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

FIG. 2 is a partial cross-sectional view of clutch assembly 100 in a clutch open position.

Figure 3:
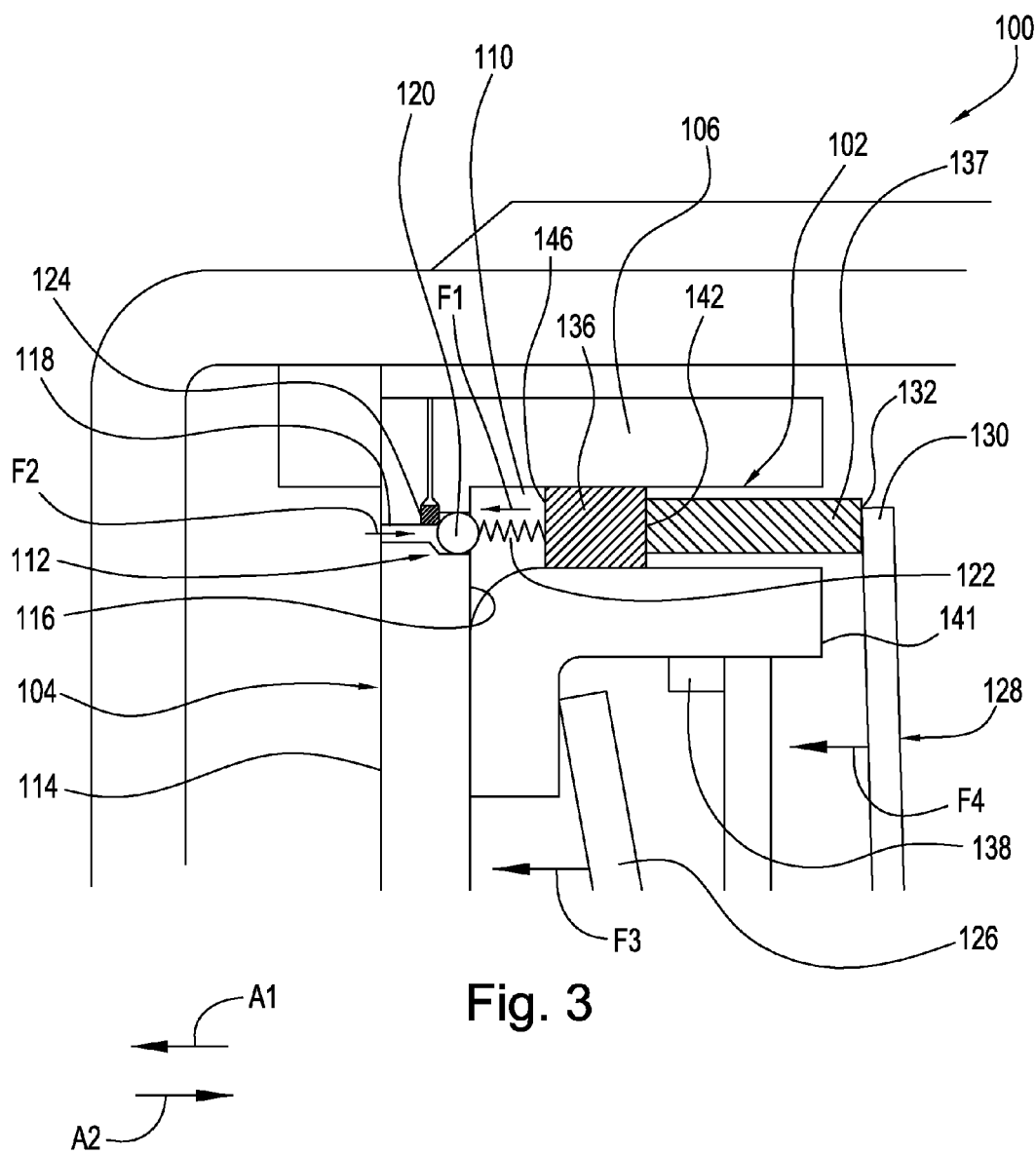
FIG. 3 is a detail of area 3 in FIG. 2.

FIG. 3 is a detail of area 3 in FIG. 2. The following should be viewed in light of FIGS. 2 and 3. Clutch assembly 100 includes secondary piston assembly 102, primary piston 104 with portion 106 located radially outward of the secondary piston assembly, chamber 108, chamber 110, and check valve 112. In an example embodiment, chamber 108 is at least partially formed by a side 114 of the primary piston and chamber 110 is at least partially formed by the secondary piston assembly and side 116 of the primary piston. In an example embodiment, the check valve includes channel 118 connecting chambers 108 and 110, displaceable element 120 at least partially disposed in the channel, resilient element 122 in constant contact with the displaceable element, and resilient element 124 at least partially disposed in the channel.

In an example embodiment, resilient element 122 urges, with force F1, the displaceable element in axial direction A1 and resilient element 124 resists, with a force F2, greater than force F1, movement of the displaceable element in axial direction A1. That is, as further discussed below, when element 122 pushes the displaceable element into contact with resilient element 124, in the absence of other forces, resilient element 124 blocks further displacement of the displaceable element in direction A1.

In an example embodiment, assembly 100 includes preloaded return springs 126 and 128. Spring 126 is engaged with the primary piston and urges, with force F3, the primary piston in axial direction A1. Spring 128 is engaged with the secondary piston assembly and urges, with force F4, less than force F3, the primary piston in axial direction A1. In an example embodiment, portion 130 of return spring 128 is axially aligned with axial end 132 of the secondary piston assembly and clutch pack 133. That is, portion 130 is axially disposed between end 132 and the clutch pack.

In an example embodiment, the assembly includes seals 134, 136, and 138. Seal 134 seals piston 104 against housing 140 to form a portion of chamber 108. Seal 136 and secondary piston 137 form the secondary piston assembly and seal 136 seals against piston 104 and bracket 141 to form a portion of chamber 110. End 142 of piston 137 is in contact with seal 136. Seal 136 is displaceable to displace the secondary piston assembly as further described below. Seal 138 forms a portion of chamber 144, which is used to balance pressure in chamber 108.

In general, the area of piston 104 in contact with pressurized fluid in chamber 108 is defined by side 114, and the area of seal 136 in contact with pressurized fluid in chamber 110 is defined by side 146 of seal 136. The area defined by side 114 is considerably greater than the area defined by side 146. In an example embodiment, the area defined by side 146 is six to ten times smaller than the area defined by side 114. Thus, as fluid pressure is equally increased in chambers 108 and 110, seal 136 (and the secondary piston assembly) moves in axial direction A2, opposite direction A1, before piston 104 axially displaces (assuming force F4 is sufficiently less than force F3). Thus, piston assembly 102 moves further, but imparts less force than piston 104.

The following describes operation of assembly 100. In FIGS. 2 and 3, return springs 126 and 128 urge the primary piston and the secondary piston assembly, respectively, in direction A1, such that piston assembly 102 is not in contact with the clutch pack and the clutch pack is open.

Figure 4:
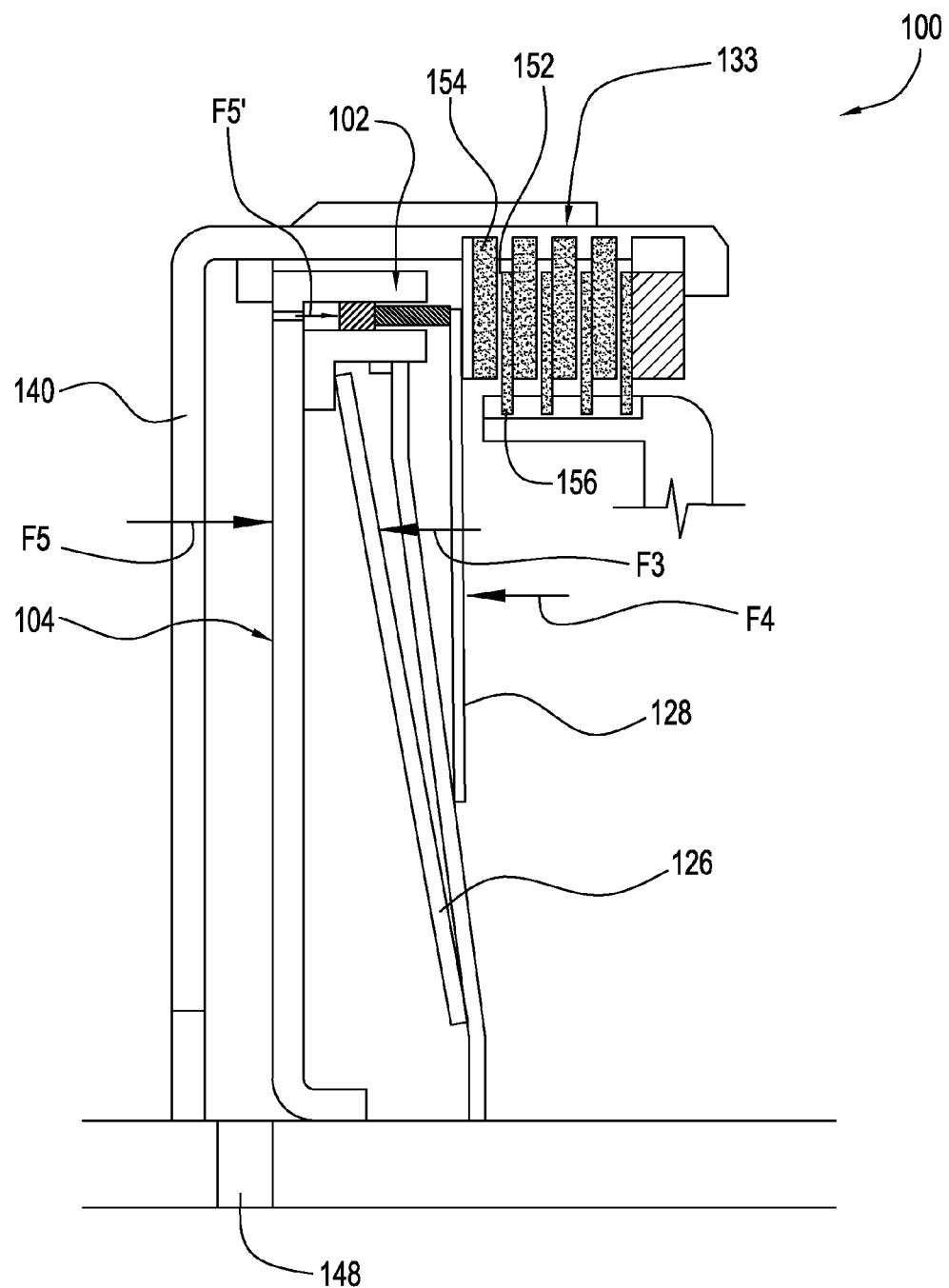
FIG. 4 is a partial cross-sectional view of the clutch assembly of FIG. 2 in a transition between a clutch open position and a clutch closed position.

FIG. 4 is a partial cross-sectional view of clutch assembly 100 of FIG. 2 in a transition between a clutch open position and a clutch closed position. The following should be viewed in light of FIGS. 2 through 4. In general, to close the clutch pack, fluid is introduced into chamber 108 via orifice 148. The check valve is open due to contact with resilient element 124 and fluid flows from chamber 108 through channel 118 into chamber 110. The pressure of the fluid in chamber 108 is increased such that the fluid in chamber 108 exerts a fluid force F5 on piston 104 and and a force F5' on seal 136. As noted above, force F4 is less than force F3 and the area defined by side 146 of seal 136 is considerably less than the area defined by side 114 of the primary piston; therefore, seal 136 and piston assembly 102 displace in direction A2 until end 132 of piston assembly 102 contacts the clutch pack, or end 132 pushes end 130 of spring 128 to contact the clutch pack, such that plates 154 and 156 are in "touch point." That is, gap 152 has been closed and plates 154 and 156 are in contact, but not clamped with sufficient force to transfer desired torque. Piston 104 does not displace in direction A2 because force F5 is not yet high enough.

Figure 5:
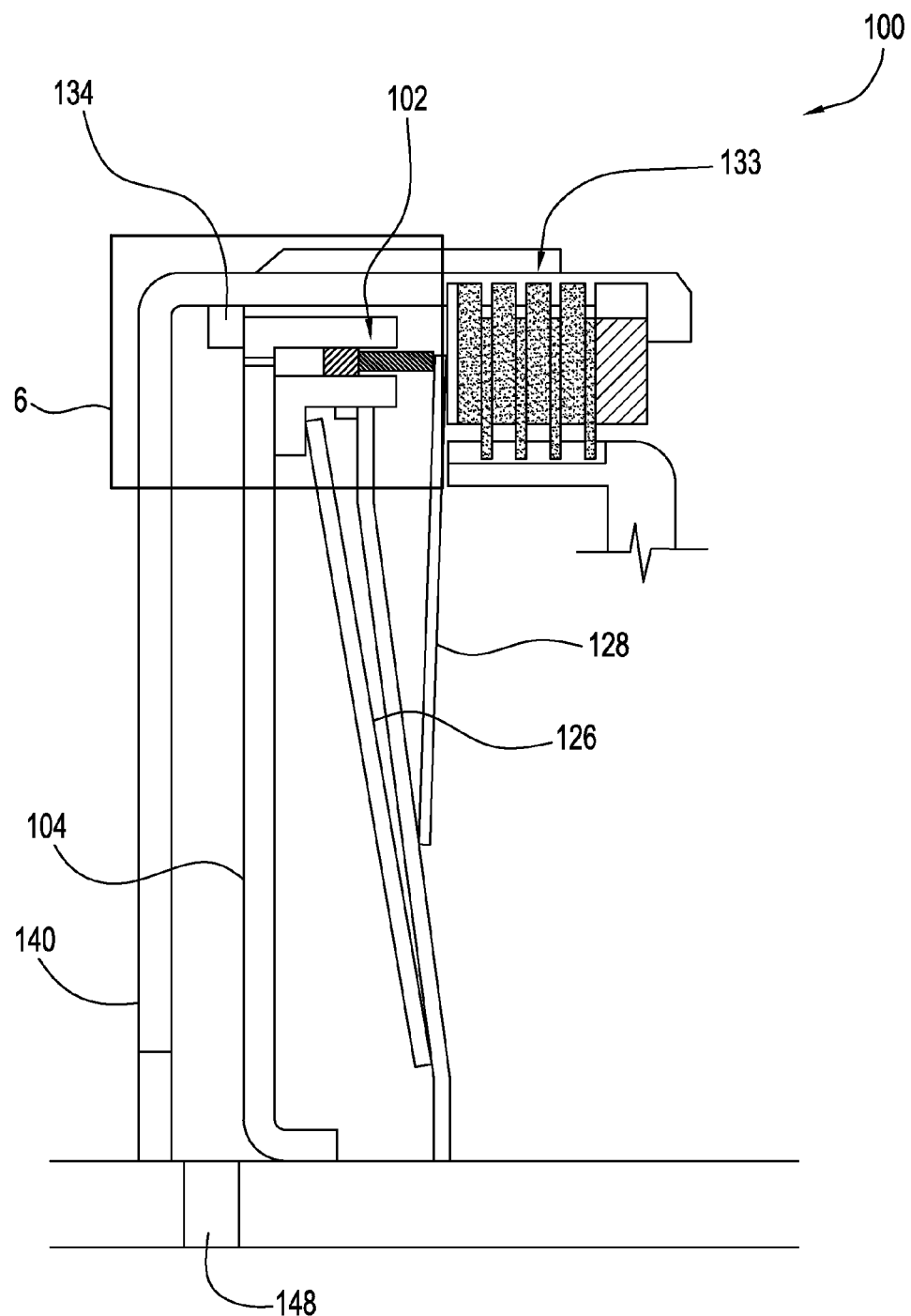
FIG. 5 is a partial cross-sectional view of the clutch assembly of FIG. 2 in a clutch closed position; and, FIG. 6 is a detail of area 6 in FIG. 5.

FIG. 5 is a partial cross-sectional view of clutch assembly 100 of FIG. 2 in a clutch closed position.

Figure 6:
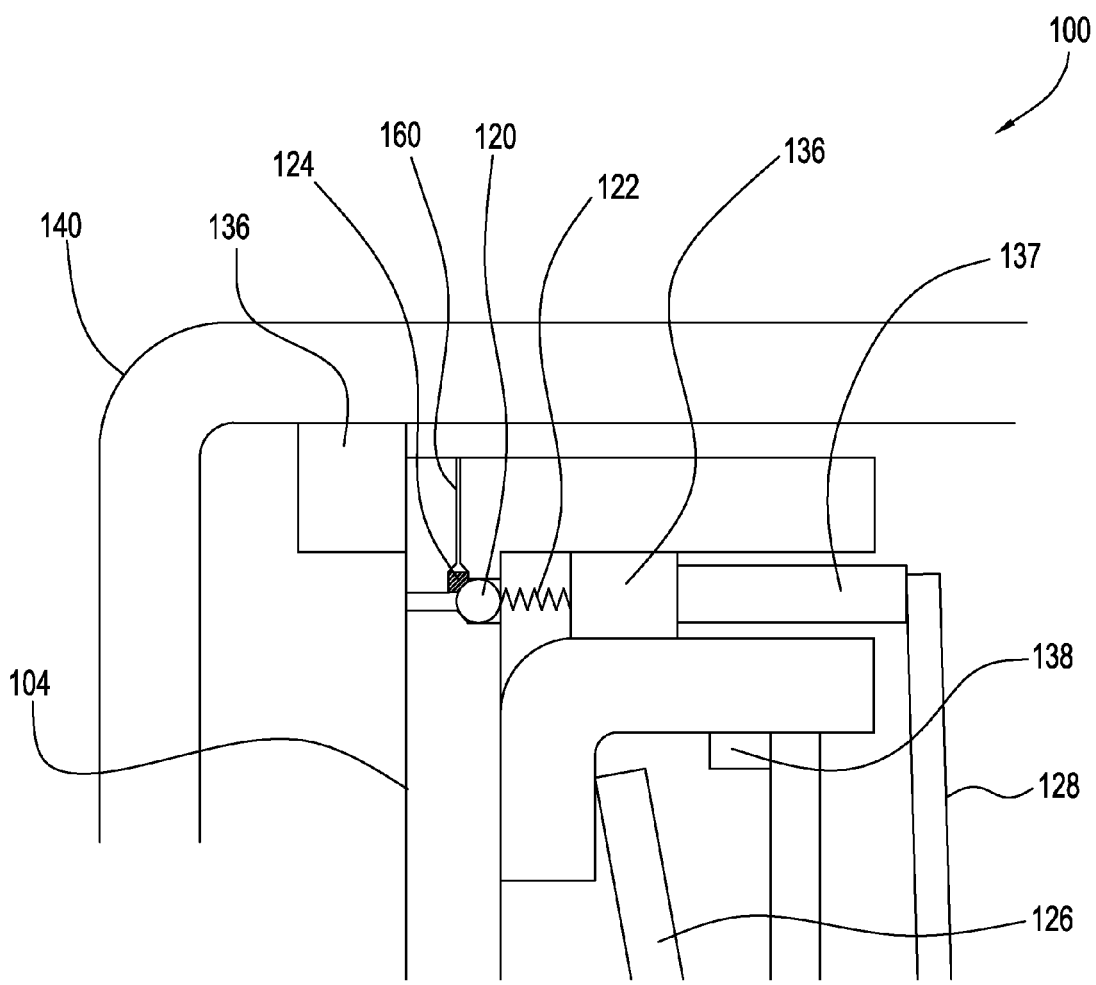

FIG. 6 is a detail of area 6 in FIG. 5. The following should be viewed in light of FIGS. 2 through 6. To close the clutch pack with sufficient force, fluid pressure in chamber 108 is increased until fluid force F5 increases to fluid force F6. In response to fluid force F6, the check valve closes, isolating chamber 110 from chamber 108, and piston 104 displaces in direction A2. Since the fluid trapped in chamber 110 is incompressible, piston assembly 102 is axially displaced in unison with piston 104, that is, piston assembly 102 is axially fixed with respect to piston 104. The pressure in chamber 108 can be increased as necessary to apply the desired closing force, via pistons 104 and 102, to the clutch pack. Thus, piston 104 only displaces a very small distance as needed to clamp the clutch pack to enable torque transfer.

In an example embodiment, element 120 is a ball, resilient element 122 is a spring, and resilient element 124 is solid compressible material, such as a plastic or rubber compound. The spring is in contact with seal 136 and the ball. As fluid flows into chamber 108, the fluid flows past the ball into chamber 110. Once piston assembly 102 displaces to contact the clutch pack, the volume of chamber 110 becomes fixed and pressure equalizes in chambers 108 and 110. In this equilibrium condition, the fluid pressure around the ball is substantially equal in all directions and element 122 urges the ball into contact with element 124. The fluid pressure force acting on element 124 is less than force F2 (the resistance of element 124 to compression/deformation). Since F1 (from element 122) also is less than F2, element 124 prevents the ball from sealing against surface 150 of the channel to close the check valve (block flow between chambers 108 and 110 through channel 118).

To close the check valve, fluid pressure in chamber 108 is increased such that fluid pressure acting on element 124 compresses element 124, enabling the ball to contact and seal against surface 150. The fluid in chamber 110 is now trapped as described above. As fluid pressure in chamber 108 is increased to displace piston 104, piston assembly 102 also displaces as described above.

To open the clutch pack, pressure is reduced in chamber 108 such that return spring 126 is able to displace the primary piston in direction A1. When the force exerted by the fluid in chamber 108 on element 124 drops below F2, element 124 "rebounds," or decompresses, to exert force F2 in direction A2 on the ball, which overcomes force F1 from element 122, displacing the ball from surface 150 to open the check valve. Element 124 keeps the check valve opens such that fluid is able to flow from chamber 110 into chamber 108. Return spring 128 pushes piston assembly 102 in direction A1 and the configuration shown in FIGS. 2 and 3 is attained. In an example embodiment, the check valve includes vent 160 to prevent pressure build up behind element 124.

In an example embodiment, assembly 100 is part of an automatic transmission, for example, is part of the shifting mechanism for a planetary automatic transmission. For example, clutch pack 133 is used to ground a gear against housing 140.

As noted above, minimizing space between clutch plates in a clutch pack is desirable to reduce the time needed to close the clutch pack. However, minimizing the space increases the viscous drag associated with the plates, which undesirably increases losses and fuel consumption. Advantageously, assembly 100 provides a means for increasing space 152 between plates 154 and 156 in the clutch pack while maintaining a desirable speed of operation for the clutch pack. Specifically, piston assembly 102, due to the smaller fluid contact area of seal 136, displaces rapidly, and before piston 104 begins to move, to engage the clutch pack as fluid pressure is increased in chamber 108. The check valve traps fluid in chamber 110, essentially fixing pistons 102 and 104 for axial movement in direction A2 (to close the clutch pack). Thus, the required movement of piston 104 in direction A2 to close and hold the clutch pack at a desired torque carrying capacity is reduced to substantially space 152 between the clutch plates. Specifically, piston 104 does not need to displace to make initial contact with the clutch pack, since piston assembly 102 has already made contact with the clutch pack. Thus, the only movement needed by piston 104 is the clamping of the clutch pack.

An additional benefit of assembly 100 is a reduction in the amount of fluid needed to displace pistons 102 and 104 to close the clutch pack. Specifically, since the displacement of piston assembly 102 is reduced, the volume increase of chamber 108 due to movement of the piston is decreased, which results in a subsequent reduction in the amount of fluid needed to fill the chamber.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A clutch assembly, comprising:
   a secondary piston assembly;
   a primary piston including a portion located radially outward of the secondary piston;
   a first chamber at least partially formed by a first side of the primary piston;
   a second chamber at least partially formed by the secondary piston assembly and a second side of the primary piston; and,
   a check valve connecting the first and second chambers, wherein:
      for a first force applied by fluid in the first chamber:
         the primary piston remains axially stationary;
         the fluid flows from the first chamber into the second chamber; and,
         the secondary piston assembly displaces in a first axial direction to contact a clutch pack; and,
      for an increase of the first force to a second force:
         fluid flow between the first and second chambers is blocked by the check valve; and,
         the primary piston and the secondary piston assembly displace in the first axial direction to close the clutch pack.

2. The clutch valve assembly of claim 1, wherein:
   the check valve includes a displaceable element and a first resilient element; and,
   during a first portion of the increase of the first force to the second force, the first resilient element is arranged to prevent the check valve from closing.

3. The clutch valve assembly of claim 2, wherein:
   the check valve includes a second resilient element; and,
   during a second portion of the increase of the first force to the second force, the first displaceable element is arranged to deform and the second resilient element is arranged to move the displaceable element to close the check valve.

4. The clutch valve assembly of claim 3, further comprising a return spring and wherein for reduction of the second force:
   the first resilient element is arranged to move the displaceable element to open the check valve; and,
   the return spring is arranged to displace the primary piston in a second axial direction, opposite the first axial direction, to open the clutch pack.

5. The clutch valve assembly of claim 1, wherein:
the check valve includes: a channel connecting the first and second chambers; a first resilient element; and a second resilient element in constant contact with a displaceable element;
during a first portion of the increase of the first force to the second force the first resilient element is arranged to contact the displaceable element to keep the channel open; and,
during a second portion of the increase of the first force to the second force:
a fluid force in the channel is arranged to deform the first resilient element such that the second resilient element moves the displaceable element to block the channel; and,
the secondary piston assembly is fixed with respect to the primary piston in one axial direction.

6. The clutch valve assembly of claim 1, further comprising:
a first return spring urging the primary piston in a second axial direction, opposite the first axial direction, with a third force; and,
a second return spring urging the secondary piston assembly in the second axial direction with a fourth force, less than the third force.

7. The clutch valve assembly of claim 6, wherein a radially outer portion of the second return spring is axially disposed between the secondary piston assembly and the clutch pack.

8. A clutch assembly, comprising:
a primary piston;
a secondary piston assembly;
a first chamber at least partially formed by the primary piston; and,
a second chamber at least partially formed by the secondary piston assembly and the primary piston, wherein the assembly is arranged such that:
in response to fluid pressure in the first chamber at a first level:
the primary piston remains axially stationary;
a second force on the secondary piston assembly increases; and,
the secondary piston assembly displaces in a first axial direction to contact a clutch pack; and,
in response to an increase in the first level:
fluid in the first chamber is isolated from fluid in the second chamber; and,
the primary piston and the secondary piston assembly displace in unison in the first axial direction to close the clutch pack.

9. The clutch valve assembly of claim 8, further comprising a check valve connecting the first and second chambers, wherein:
in response to fluid force in the first chamber at the first level, fluid flows through the check valve to the second chamber; and,
in response to the increase in the first level, the check valve is arranged to block fluid flow between the first and second chambers.

10. The clutch valve assembly of claim 9, wherein in response to decreasing the second level, the check valve is arranged to open.

11. The clutch valve assembly of claim 10, wherein:
the check valve includes a resilient element and a displaceable element; and,
the resilient element is arranged to displace the displaceable element to open the check valve.

12. The clutch valve assembly of claim 9, wherein:
the check valve includes first and second resilient elements and a displaceable element;
in response to fluid force in the first chamber at the first level, the displaceable element is arranged to move in the first axial direction such that the check valve is open; and,
in response to the increase in the first level:
the first resilient element is arranged to displace the displaceable element in a second axial direction; and,
the second resilient element is arranged to deform such that the displaceable element closes the check valve.

13. A clutch assembly, comprising:
a clutch pack;
a primary piston;
a secondary piston assembly;
a first chamber at least partially formed by a first side of the primary piston;
a second chamber at least partially formed by the secondary piston assembly and a second side of the primary piston; and,
a check valve including:
a channel connecting the first and second chambers;
a displaceable element at least partially disposed in the channel;
a first resilient element in constant contact with the displaceable element; and,
a second resilient element at least partially disposed in the channel, wherein the secondary piston assembly is arranged to displace in a first axial direction to contact and close the clutch pack.

14. The clutch valve assembly of claim 13, further comprising:
a first return spring engaged with the primary piston and urging, with a first force, the primary piston in a second axial direction, opposite the first axial direction; and,
a second return spring engaged with the secondary piston assembly and urging, with a second force, less than the first force, the primary piston in the second axial direction.

15. The clutch valve assembly of claim 14, wherein a portion of the second return spring is axially aligned with an axial end of the secondary piston assembly and the clutch pack.

16. The clutch valve assembly of claim 13, wherein the primary piston includes a portion located radially outward of the secondary piston assembly.

17. The clutch valve assembly of claim 13, wherein:
the first resilient element urges, with a first force, the displaceable element in a second axial direction, opposite the first axial direction; and,
the second resilient element resists, with a second force, greater than the first force, movement of the displaceable element in the second axial direction.

* * * * *